United States Patent [19]
Schmitz et al.

[11] Patent Number: 5,993,980
[45] Date of Patent: *Nov. 30, 1999

[54] PROTECTIVE COATING FOR PROTECTING A COMPONENT FROM CORROSION, OXIDATION AND EXCESSIVE THERMAL STRESS, PROCESS FOR PRODUCING THE COATING AND GAS TURBINE COMPONENT

[75] Inventors: Friedheim Schmitz, Dinslaken; Norbert Czech, Dorsten, both of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,462

[22] Filed: Apr. 14, 1997

Related U.S. Application Data

[63] Continuation of application No. PCT/EP95/03919, Oct. 4, 1995.

[30] Foreign Application Priority Data

Oct. 14, 1994 [EP] European Pat. Off. ............. 94116247

[51] Int. Cl.$^6$ ............................. F01D 5/28; C22C 19/05; C23C 4/08; C23C 14/16
[52] U.S. Cl. ......................... 428/633; 428/678; 428/937; 428/938; 427/456; 427/255.7; 416/241 R; 416/241 B
[58] Field of Search .................................... 428/621, 623, 428/633, 632, 678, 680, 668, 937, 938; 427/250, 456, 454, 255.7; 416/241 R, 241 B; 204/192.15, 192.16

[56] References Cited

U.S. PATENT DOCUMENTS

| | | | |
|---|---|---|---|
| 4,055,705 | 10/1977 | Stecura et al. | 428/633 |
| 4,321,310 | 3/1982 | Ulion et al. | 428/612 |
| 4,321,311 | 3/1982 | Strangman | 428/623 |
| 4,451,299 | 5/1984 | Smeggil et al. | 148/1 |
| 4,569,889 | 2/1986 | Przybyszewski et al. | 428/612 |
| 5,087,477 | 2/1992 | Giggins, Jr. et al. | 427/38 |
| 5,154,885 | 10/1992 | Czech et al. | 420/588 |
| 5,236,745 | 8/1993 | Gupta et al. | 428/633 |
| 5,268,238 | 12/1993 | Czech et al. | 428/678 |
| 5,273,712 | 12/1993 | Czech et al. | 420/40 |
| 5,401,307 | 3/1995 | Czech et al. | 106/14.05 |
| 5,499,905 | 3/1996 | Schmitz et al. | 416/241 R |
| 5,582,635 | 12/1996 | Czech et al. | 106/14.05 |
| 5,599,385 | 2/1997 | Czech et al. | 106/14.05 |

FOREIGN PATENT DOCUMENTS

| | | |
|---|---|---|
| 0 207 874 A3 | 1/1987 | European Pat. Off. . |
| 0 266 299 A2 | 5/1988 | European Pat. Off. . |
| 0 412 397 A1 | 2/1991 | European Pat. Off. . |
| 0 532 150 A1 | 3/1993 | European Pat. Off. . |
| 660 200 A5 | 3/1987 | Switzerland . |
| 89/07159 | 8/1989 | WIPO . |

*Primary Examiner*—John J. Zimmerman
*Attorney, Agent, or Firm*—Herbert L. Lerner; Laurence A. Greenberg

[57] ABSTRACT

A protective coating for protecting a component from corrosion and oxidation at a high temperature and from excessive thermal stress, has a heat insulation layer including a ceramic material and an adhesion-promoting layer including a rhenium containing metal alloy. The metal alloy belongs to the alloys covered by the general term MCrAlY, where M represents cobalt and/or nickel and Y represents yttrium and/or at least one equivalent metal from the group including scandium and the rare earth elements. The protective coating is distinguished by high oxidation resistance and corrosion resistance of the alloy, by outstanding thermal fatigue properties and an effective and permanent bond between the alloy and the ceramic heat insulation layer. As a result of the heat insulation, the temperature at the outer surface of the protective coating can be considerably higher than with purely metallic protective coatings, without an increased thermal load being exerted on the component. The protective coating is therefore particularly suitable for a gas turbine component exposed to a hot combustion gas, for example a guide vane, a rotor blade or a heat shield.

25 Claims, No Drawings

PROTECTIVE COATING FOR PROTECTING A COMPONENT FROM CORROSION, OXIDATION AND EXCESSIVE THERMAL STRESS, PROCESS FOR PRODUCING THE COATING AND GAS TURBINE COMPONENT

CROSS-REFERENCE TO RELATED APPLICATION

This application is a Continuation of International Application Serial No. PCT/EP95/03919, filed Oct. 4, 1995.

BACKGROUND OF THE INVENTION

Field of the Invention

The invention relates to a multilayer protective coating for protecting a component from corrosion and oxidation at a high temperature and from excessive thermal stress, a process for coating a component with a multilayer protective coating, and a component, in particular a gas turbine component, which is coated with a multilayer protective coating.

A metal article, in particular a gas turbine blade, which is known from Published European Patent Application 0 266 299 A2, corresponding to U.S. Pat. No. 4,861,618, has a protective coating for protecting the metal article at elevated temperature. The protective coating includes a ceramic heat insulation layer of zirconium oxide with yttrium oxide added, and an adhesion layer, connecting the heat insulation layer to the metal article, including an alloy composed of the following elements by weight: 15–40% cobalt, 10–40% chromium, 6–15% aluminum, 0–2% hafnium, 0–7% silicon, 0.01 to 1.0% yttrium and the remainder nickel. The adhesion layer and the heat insulation layer can be applied to the metal article by atmospheric plasma spraying.

Metallic protective coatings for metallic components, in particular for gas turbine components, which are intended to increase their corrosion resistance and/or oxidation resistance, are known in the prior art. In the case of stationary gas turbines with material temperatures of about 950° C. and gas turbines in aircraft engines with inlet temperatures of about 1100° C., an inlet temperature increase which influences the thermodynamic efficiency has been achieved by the use of specially developed alloys as base materials for components, such as guide vanes and rotor blades, that are subjected to high thermal loads. It has been possible to consider temperatures substantially above 1000° C. for those components, particularly as a result of the use of monocrystalline superalloys. In addition to thermomechanical stresses, such a component is also exposed to chemical attack, for example by a combustion gas with a temperature up to more than 1300° C. In order to ensure sufficient resistance to such an attack, the component is usually covered with a metallic protective coating. The protective coating must have sufficiently good mechanical properties. The protective coating should be sufficiently ductile to be able to comply with any deformations of the base material, particularly with regard to the mechanical interaction between the protective coating and the base material of the component. It should also have as little susceptibility to cracking as possible, in order to prevent corrosion and oxidation of the base material.

A plurality of protective coatings is known under the general term MCrAlY, where M represents at least one of the elements from the group including iron, cobalt and nickel and further essential components are chromium, aluminum and yttrium or a metal which is selected from the group including scandium and the rare earth elements and is equivalent to yttrium.

Such an alloy which is used in a process for improving the oxidation resistance of a superalloy component covered with a protective coating is described in U.S. Pat. No. 4,451,299. The protective coating contains 15–45% chromium, 7–20% aluminum and 0.1–5% yttrium (data in each case in percent by weight). The yttrium may be replaced by lanthanum and cerium. In addition, the protective coating optionally contains a mixture of further elements from the group including platinum, rhenium, silicon, tantalum and magnesium in an amount of up to 10%. That U.S. patent does not reveal the extent to which the addition of one of those optional elements contributes to the improvement in the oxidation resistance of the superalloy. Furthermore, the wide ranges for possible admixing which are specified in little detail provide no qualification of the protective coating for particular conditions, for example in a stationary gas turbine with high inlet temperature, if it is operated not only under full load but also under part load over prolonged periods.

A protective coating which is intended to improve the corrosion properties and oxidation properties in a surface temperature range of 600° C. to 1150° C. is described in Published European Patent Application 0 412 397 A1, corresponding to U.S. Pat. No. 5,268,238. The protective coating contains an amount of 1 to 20% rhenium in addition to 22–50% chromium, 0–15% aluminum and 0.3–2% yttrium or another element from the group including the rare earths. The action of the rhenium with regard to an improvement in corrosive and oxidizing effects resembles the positive actions of platinum. Due to the good thermal conductivity of the metallic protective coating, a component covered with the protective coating is exposed to virtually the same thermal load as the protective coating itself.

Published International Patent Application WO 89/07159 describes a two-layer metallic protective coating including two different alloys. An outer alloy of those alloys is covered by the general term MCrAlY and contains (stated in % by weight) 15 to 40% chromium, 3 to 15% aluminum and 0.2 to 3% of at least one element from the group including yttrium, tantalum, hafnium, scandium, zirconium, niobium, rhenium and silicon. That alloy in turn is preferably surrounded by a thermal barrier layer, in particular on a component cooled from the inside, for protection against particularly high temperatures. The thermal barrier layer may be zirconium oxide with added yttrium oxide. Oxidation of the alloy prior to application of the thermal barrier layer is envisaged in order to prevent possible flaking of the thermal barrier layer from the alloy.

Published European Patent Application 0 532 150 A1 describes a component covered with a protective layer and including a superalloy, for example a turbine blade. The protective coating contains at least 2% (stated in % by weight) tantalum as an essential element in addition to chromium and aluminum. The protective coating optionally contains up to 1% yttrium and up to 4% rhenium. In the case of a protective coating including such an alloy, Published European Patent Application 0 532 150 A1 considers a coating including a ceramic thermal barrier to be possible but does not discuss the interaction between the alloy and the thermal barrier, which interaction is critical in the case of temperature changes.

U.S. Pat. Nos. 4,055,705, 4,321,310 and 4,321,311 relate to protective coatings for gas turbine components including superalloys based on nickel or cobalt. According to those patents, a protective coating includes a ceramic heat insulation layer which preferably has a columnar crystal structure and is present on an adhesion promoting layer which in turn is present on the base material of the gas turbine component and binds the heat insulation layer to the base material. The adhesion promoting layer includes an alloy of the type MCrAlY. It is essential that the adhesion-promoting layer develops, between itself and the heat insulation layer, a thin aluminum oxide layer on which the heat insulation layer is anchored.

U.S. Pat. No. 5,087,477 presents a process for applying a ceramic heat insulation layer to a gas turbine component. That process includes a physical vapor deposition (PVD) process, in which compounds that are intended to form the heat insulation layer are vaporized through the use of an electron beam and an atmosphere having a defined and carefully controlled oxygen content is produced in the environment of the component.

SUMMARY OF THE INVENTION

It is accordingly an object of the invention to provide a protective coating for protecting a component from corrosion, oxidation and excessive thermal stress, a process for producing the coating and a gas turbine component, which overcome the hereinafore-mentioned disadvantages of the heretofore-known products and methods of this general type, in which the protective coating includes a ceramic heat insulation layer and an adhesion-promoting layer of the MCrAlY type, has good resistance to corrosion and oxidation at a high temperature, is adapted to a high alternating and continuous thermomechanical stress and ensures a low level of heat transfer.

With the foregoing and other objects in view there is provided, in accordance with the invention, a protective coating for protecting a component from corrosion and oxidation at a high temperature and from excessive thermal stress, comprising a heat insulation layer of a ceramic material; and an adhesion-promoting layer binding the heat insulation layer to a component and including an alloy with the following composition in percent by weight: 5 to 20% rhenium, 15 to 35% chromium, 7 to 18% aluminum, 0.3 to 2% of yttrium and/or at least one equivalent metal from the group including scandium and the rare earth elements, 0 to 3% silicon, 0 to 5% hafnium, 0 to 5% tantalum, 0 to 2% zirconium, 0 to 12% tungsten, 0 to 10% manganese, 0 to 4% niobium, and a remainder including cobalt and/or nickel and impurities associated with the preparation.

With regard to the advantageous thermomechanical properties of the composition of the alloy, the additional elements (Si, Hf, Ta, Zr, W, Mn) are not essential and the adhesion-promoting layer is preferably free of tungsten, manganese and niobium. The amount of tantalum is preferably less than 2%, particularly less than 1%.

Both protection of the component from corrosion and oxidation as well as heat insulation with respect to a high temperature present at the outer surface of the heat insulation layer are achieved by a multilayer protective coating including at least one heat insulation layer and at least one adhesion-promoting layer, through the use of which the heat insulation layer is bound to a component. Thus, continuous use of a component, for example in a gas turbine, at considerably higher ambient temperature as compared with a purely metallic protective coating, is permitted. The resulting temperature difference over the protective coating may be up to 100° C., possibly even more. In the case of a gas turbine, the inlet temperature of the combustion gas can therefore be increased. Thus, the thermodynamic efficiency of the gas turbine is improved.

By adding the element rhenium to the alloy of the type MCrAlY, both the oxidation and corrosion resistance of the alloy and its thermal fatigue property are permanently improved. Due to the low oxidation rate of such an alloy, oxidation of the adhesion-promoting layer, for example due to oxygen diffusion through the ceramic heat insulation layer, only takes place extremely slowly. In addition, it was found, surprisingly, that the thermal fatigue properties of the rhenium-containing alloy in interplay with the heat insulation layer are substantially improved. The danger of the heat insulation layer flaking off is thus significantly reduced. Failure of the protective coating, in this case delamination of the heat insulation layer from the adhesion-promoting layer, can accordingly occur only after very long periods of use. The life of a component, in particular inside a gas turbine, is thus considerably prolonged. Furthermore, the occurrence of cracks in the adhesion-promoting layer as a result of thermal fatigue, i.e. as a result of cyclic expansion and contraction due to temperature differences, is likewise substantially reduced by the alloy. This applies even to those edge regions of the protective coating which are susceptible to cracking, in particular in the vicinity of cooling air holes in gas turbine blades.

Depending on requirements, the protective coating may be composed of several layers. This applies both to the heat insulation layer and to the adhesion-promoting layer, and both may be formed of several layers.

The advantageous low-oxidation properties of the rhenium-containing alloy are evident, for example, under isothermal heat loads at 950–1000° C. over a period of up to 5000 hours.

In accordance with another feature of the invention, the alloy contains 7 to 15% aluminum, 15 to 30% chromium and 5 to 10% of rhenium. In this case, the advantageous properties with respect to oxidation resistance and corrosion resistance as well as thermal fatigue are particularly evident. The amount of chromium is preferably between 23 and 28%.

The alloy having a rhenium content of over 5% exhibits a significantly lower oxidation rate as compared with alloys of the type MCrAlY without added rhenium, which leads to the formation of a thinner oxide layer as is shown, for example, by experiments under cyclic oxidation load with temperature changes between 300° C. and 1000° C. A thin oxide layer at the interface between the adhesion promoting layer and the ceramic heat insulation layer leads to a reduction of tensile stresses within the ceramic heat insulation layer, with the result that cracking and flaking of the heat insulation layer is considerably delayed.

With the objects of the invention in view, there is also provided a protective coating for protecting a component from corrosion and oxidation at a high temperature and from excessive thermal stress, comprising a heat insulation layer of a ceramic material; and an adhesion-promoting layer including a metal alloy of the composition MCrAlY where M represents at least one of cobalt and nickel and Y represents at least one of yttrium and at least one equivalent metal from the group including scandium and the rare earth elements, and a portion of at least 4% rhenium in percent by weight.

In accordance with another feature of the invention, the heat insulation layer contains zirconium oxide ($ZrO_2$) which, due to its relatively high and therefore metal-like expansion coefficient, is particularly suitable for providing the adhesion-promoting layer with a heat-insulating coating.

In accordance with a further feature of the invention, in order to avoid a possible troublesome phase transformation of the zirconium oxide, the latter is preferably stabilized by adding 5–20%, in particular 6–8%, of yttrium oxide ($Y_2O_3$).

With the objects of the invention in view, there is additionally provided a component, in particular a gas turbine component, which is covered, for protection from corrosion and oxidation at a high temperature, with a protective coating that has a multilayer structure and includes at least a heat insulation layer including a ceramic material and an adhesion-promoting layer including a rhenium-containing alloy of the type MCrAlY. The adhesion-promoting layer is firmly bound to the base material of the component and has high physical compatibility with this base material and little tendency to diffuse. The heat insulation layer in turn is applied to the adhesion-promoting layer and preferably has a coefficient of thermal expansion which is adapted to the adhesion-promoting layer. The component is at least partly thermally insulated against the surrounding atmosphere by the heat insulation layer. Especially in the case of a component in a gas turbine which is fed with a combustion gas that has a temperature above 950° C., the thermal load on the component is thus substantially reduced. The protective coating is particularly qualified for protecting a gas turbine component, in particular a guide vane, a rotor blade, a heat shield or another component which is fed with hot gas.

In accordance with another feature of the invention, particularly in the case of a blade of a gas turbine, the heat insulation layer has a thickness of 50 μm to 300 μm.

In accordance with a further feature of the invention, in the case of a heat shield of a gas turbine or of another stationary component, the thickness of the heat insulation layer is 200 μm to 3000 μm.

In accordance with an added feature of the invention, the thickness of the adhesion-promoting layer is 50 μm to 300 μm.

With the objects of the invention in view, there is additionally provided a process for coating a component with a protective coating, which comprises applying the adhesion-promoting layer to a component by thermal spraying, in particular vacuum plasma spraying (VPS) or physical vapor deposition (PVD); and then applying the heat insulation layer to the adhesion-promoting layer by atmospheric plasma spraying (APS) or physical vapor deposition (PVD).

Examples of suitable physical vapor deposition processes are vapor deposition, cathode sputtering and ion plating. Depending on the size and field of use of the component, other coating processes can also be used for the production of both the adhesion-promoting layer and the heat insulation layer.

The invention is distinguished by a multilayer protective coating for protecting a component from corrosion and oxidation at a high temperature and from excessive thermal stress. The protective layer has at least one heat insulation layer including a ceramic material and an adhesion-promoting layer including a rhenium-containing metal alloy. The metal alloy belongs to the alloys covered by the general term MCrAlY, where M represents cobalt and/or nickel and Y represents yttrium and/or at least one equivalent metal from the group including scandium and the rare earth elements. The heat insulation layer preferably contains zirconium oxide stabilized with yttrium oxide. Due to the advantageous properties of the adhesion-promoting layer such as, for example, a low oxidation rate, high resistance to sulfur compounds and high mechanical stability at high temperatures, in association with the low thermal conductivity of the heat insulation layer, effective and lasting protection of the component from corrosion and oxidation is ensured. In addition, as a result of outstanding thermal fatigue properties of the adhesion-promoting layer, particularly in the case of a rhenium content of more than 4%, an effective and lasting bond is produced between the ceramic heat insulation layer and the metallic adhesion promoting layer. The protective coating is particularly suitable for coating a gas turbine component which is exposed to a hot combustion gas. The temperatures at the surface of the protective coating may be 950° C. to over 1300° C. In order to coat the component with the protective coating, the adhesion-promoting layer is preferably applied to the component through the use of vacuum plasma spraying or physical vapor deposition. The heat insulation layer is then applied to the adhesion-promoting layer through the use of atmospheric plasma spraying or physical vapor deposition.

Other features which are considered as characteristic for the invention are set forth in the appended claims.

Although the invention is illustrated and described herein as embodied in a protective coating for protecting a component from corrosion, oxidation and excessive thermal stress, a process for producing the coating and a gas turbine component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENTS

One embodiment of the invention is described below.

A gas turbine blade, which is hollow for the passage of a cooling gas, is cast from the material IN792. This material is composed of the following amounts by weight: 0.08% carbon, 12.5% chromium, 9.0% cobalt, 1.9% molybdenum, 4.1% tungsten, 4.1% tantalum, 3.4% aluminum, 3.8% titanium, 0.015% boron, 0.02% zirconium and the remainder being nickel and impurities associated with the preparation, in usual amounts. This gas turbine blade is protected from corrosion, oxidation and excessive thermal stress as follows:

First, a metallic adhesion-promoting layer is applied by vacuum plasma spraying with the use of a powder of an alloy which is composed of the following amounts by weight: 25 to 29% cobalt, 21 to 22% chromium, 7 to 8% aluminum, 0.5 to 0.7% yttrium, 0.3 to 0.7% silicon, 9.5 to 10.5% rhenium and the remainder being nickel and impurities associated with the preparation, in usual amounts. During application of the layer, a maximum roughness of $R_z=30$ μm should be established by a suitable choice of the particle size of the powder and of the operating parameters of the spray process. The thickness of the adhesion-promoting layer can in turn be between 50 μm and 300 μm. The coated gas turbine blades are then subjected to a heat treatment for two hours at 1120° C. and in vacuo. After this heat treatment which serves for binding the adhesion-promoting layer to the base material of the gas turbine blade by interdiffusion, smoothing of the adhesion-promoting layer to a maximum roughness of $R_a=2$ μm is carried out by vibratory grinding, before which, if required, blasting can be effected using glass beads or sand.

A ceramic heat insulation layer is applied to the coated gas turbine blade which is prepared in this manner, through the use of electron beam evaporation and physical vapor deposition (EB-PVD). The composition of the heat insulation layer is essentially partly stabilized zirconium oxide, in particular zirconium oxide containing 6 to 8% by weight of yttrium oxide. The heat insulation layer is applied to a thickness of between 125 and 175 µm. The vapor deposition process should be carried out in such a way that the heat insulation layer grows in the form of columnar or acicular crystallites. It is not absolutely essential to cover cooling air holes or slots during application of the heat insulation layer. As a rule, smoothing of the heat insulation layer is also not necessary. Finally, the coated gas turbine blade is subjected to a further heat treatment. This heat treatment is carried out initially for two hours at 1120° C. in vacuo and then for several hours at 845° C. under air.

We claim:

1. A protective coating for protecting a component from corrosion and oxidation at a high temperature and from excessive thermal stress, comprising:
   a insulation layer of a ceramic material having a thickness in a range from 50 µm to 3000 µm; and
   an adhesion-promoting layer binding said heat insulation layer to a component and including an alloy with the following composition in percent by weight:
   5 to 20% rhenium,
   15 to 35% chromium,
   7 to 18% aluminum,
   0.3 to 2% of at least one element selected from the group consisting of yttrium, scandium, and the rare earth elements,
   0 to 3% silicon,
   0 to 5% hafnium,
   0 to 5% tantalum,
   0 to 2% zirconium,
   0 to 12% tungsten,
   0 to 10% manganese,
   0 to 4% niobium, and
   remainder including at least one of cobalt and nickel and impurities associated with the preparation.

2. The protective coating according to claim 1, including:
   7 to 15% aluminum,
   15 to 30% chromium and
   5 to 11% rhenium.

3. A protective coating for protecting a component from corrosion and oxidation at a high temperature and from excessive thermal stress, comprising:
   a heat insulation layer of a ceramic material having a thickness in a range from 50 µm to 3000 µm; and
   an adhesion-promoting layer including a metal alloy of the composition MCrAlY where M represents at least one of cobalt and nickel and Y represents at least one element selected from the group consisting of yttrium, scandium, and the rare earth elements, and a portion of at least 5% rhenium in percent by weight.

4. The protective coating according to claim 1, wherein said insulation layer contains zirconium oxide ($ZrO_2$).

5. The protective coating according to claim 3, wherein said insulation layer contains zirconium oxide ($ZrO_2$).

6. The protective coating according to claim 4, wherein said zirconium oxide is stabilized with 5 to 20% yttrium oxide ($Y_2O_3$).

7. The protective coating according to claim 4, wherein said zirconium oxide is stabilized with 6 to 8% yttrium oxide ($Y_2O_3$).

8. The protective coating according to claim 5, wherein said zirconium oxide is stabilized with 5 to 20% yttrium oxide ($Y_2O_3$).

9. The protective coating according to claim 5, wherein said zirconium oxide is stabilized with 6 to 8% yttrium oxide ($Y_2O_3$).

10. A gas turbine component, comprising:
    a component body; and
    a protective coating for protecting said component body from corrosion and oxidation at a high temperature and from excessive thermal stress, said protective coating including:
    a heat insulation layer of a ceramic material having a thickness in a range from 50 µm to 3000 µm; and
    an adhesion-promoting layer binding said heat insulation layer to said component body and including an alloy with the following composition in percent by weight:
    5 to 20% rhenium,
    15 to 35% chromium,
    7 to 18% aluminum,
    0.3 to 2% of at least one element selected from the group consisting of yttrium, scandium, and the rare earth elements,
    0 to 3% silicon,
    0 to 5% hafnium,
    0 to 5% tantalum,
    0 to 2% zirconium,
    0 to 12% tungsten,
    0 to 10% manganese,
    0 to 4% niobium, and
    a remainder including at least one of cobalt and nickel and impurities associated with the preparation.

11. The component according to claim 10, wherein said component body is a rotor blade body.

12. The component according to claim 10, wherein said component body is a guide vane body.

13. The component according to claim 10, wherein said component body is a heat shield body.

14. A gas turbine component, comprising:
    a component body; and
    a protective coating for protecting said component body from corrosion and oxidation at a high temperature and from excessive thermal stress, said protective coating including:
    a heat insulation layer of a ceramic material having a thickness in a range from 50 µm to 3000 µm; and
    an adhesion-promoting layer including a metal alloy of the composition MCrAlY where M represents at least one of cobalt and nickel and Y represents at least one element selected from the group consisting of yttrium, scandium, and the rare earth elements, and a portion of at least 5% rhenium in percent by weight.

15. The component according to claim 14, wherein said component body is a rotor blade body.

16. The component according to claim 14, wherein said component body is a guide vane body.

17. The component according to claim 14, wherein said component body is a heat shield body.

18. The protective coating according to claim 1, wherein said heat insulation layer is 50 µm to 300 µm thick.

19. The protective coating according to claim 3, wherein said heat insulation layer is 50 µm to 300 µm thick.

20. The protective layer according to claim 1, wherein said heat insulation layer is 200 µm to 3000 µm thick.

21. The protective layer according to claim 3, wherein said heat insulation layer is 200 µm to 3000 µm thick.

22. The protective layer according to claim 1, wherein said adhesion promoting layer is 50 µm to 300 µm thick.

23. The protective layer according to claim 3, wherein said adhesion promoting layer is 50 µm to 300 µm thick.

24. A process for coating a component with a protective coating, which comprises:

applying an adhesion-promoting layer including an alloy with the following composition in percent by weight;
5 to 20% rhenium,
15 to 35% chromium,
7 to 18% aluminum,
0.3 to 2% of at least one element selected from the group consisting of yttrium, scandium, and the rare earth elements,
0 to 3% silicon,
0 to 5% hafnium,
0 to 5% tantalum,
0 to 2% zirconium,
0 to 12% tungsten,
0 to 10% manganese,
0 to 4% niobium, and
a remainder including at least one of cobalt and nickel and impurities associated with the preparation, to a component by thermal spraying or physical vapor deposition (PVD); and applying a heat insulation layer of a ceramic material to the adhesion-promoting layer by atmospheric plasma spraying (APS) or physical vapor deposition (PVD).

25. A process for coating a component with a protective coating, which comprises:

applying an adhesion-promoting layer including a metal alloy of the composition MCrAlY where M represents at least one of cobalt and nickel and Y represents at least one element selected from the group consisting of yttrium, scandium, and the rare earth elements, and a portion of at least 5% rhenium in percent by weight, to a component by thermal spraying or physical vapor deposition (PVD); and applying a heat insulation layer of a ceramic material to the adhesion-promoting layer by atmospheric plasma spraying (APS) or physical vapor deposition (PVD).

* * * * *